United States Patent [19]
Mok

[11] Patent Number: 6,126,020
[45] Date of Patent: Oct. 3, 2000

[54] ASSEMBLABLE STORAGE AND DISPLAY UNIT

[75] Inventor: Sze Man Mok, Hong Kong, The Hong Kong Special Administrative Region of the People's Republic of China

[73] Assignee: Sunhing Millennium Limited, Kowloon, The Hong Kong Special Administrative Region of the People's Republic of China

[21] Appl. No.: 09/226,063

[22] Filed: Jan. 6, 1999

[51] Int. Cl.[7] .............................. A47G 29/00; A47B 57/34
[52] U.S. Cl. ................................ 211/40; 211/194; 108/91; 108/147.11
[58] Field of Search ..................... 211/40, 41.12, 211/188, 194, 13.1, 42, 36; D6/407; 248/162.1, 123.1, 243–245; 206/509, 511, 512; 108/147.11, 147.12, 147.16, 91, 149

[56] References Cited

U.S. PATENT DOCUMENTS

| | | | |
|---|---|---|---|
| Re. 35,761 | 4/1998 | Dardashti | 211/41.12 |
| D. 353,376 | 12/1994 | Fukutomi | D6/407 |
| D. 359,648 | 6/1995 | Hwang | D6/407 |
| D. 360,329 | 7/1995 | Chu | D6/407 |
| D. 364,979 | 12/1995 | Thomas et al. | D6/407 |
| D. 367,188 | 2/1996 | Levine | D6/407 |
| D. 370,137 | 5/1996 | David | D6/407 |
| D. 370,377 | 6/1996 | Hsu | D6/407 |
| 4,354,603 | 10/1982 | Dunn | 211/41.12 |
| 5,314,077 | 5/1994 | Theosobrata | 211/41.12 |
| 5,341,943 | 8/1994 | Fraser | 211/40 |
| 5,358,124 | 10/1994 | Mueller | 211/41.12 |
| 5,370,242 | 12/1994 | Huang | 211/40 |
| 5,579,925 | 12/1996 | Peng | 211/41.12 |
| 5,584,398 | 12/1996 | Lin | 211/40 |
| 5,607,065 | 3/1997 | Todd | 211/41.12 |
| 5,634,563 | 6/1997 | Peng | 211/40 |
| 5,636,752 | 6/1997 | Gallagher | 211/41.12 |
| 5,788,088 | 8/1998 | Kao | 211/40 |
| 5,853,091 | 12/1998 | Luenser | 211/40 |
| 5,984,115 | 11/1999 | Koestenblatt et al. | 211/40 |

*Primary Examiner*—Daniel P. Stodola
*Assistant Examiner*—Jennifer E. Novosad
*Attorney, Agent, or Firm*—Christie, Parker & Hale, LLP

[57] ABSTRACT

A storage unit for compact discs or other like storage media having three column members positioned in a triangular formation when seen from above. A plurality of substantially horizontal shelves are each located in slots provided in the column members. Each shelf member can receive onto its surface between columns at least two storage media items, each spaced from the adjacent item by relief features which may include an upward projection of the shelf member, a downward projection of the proximate shelf member, or both.

15 Claims, 13 Drawing Sheets

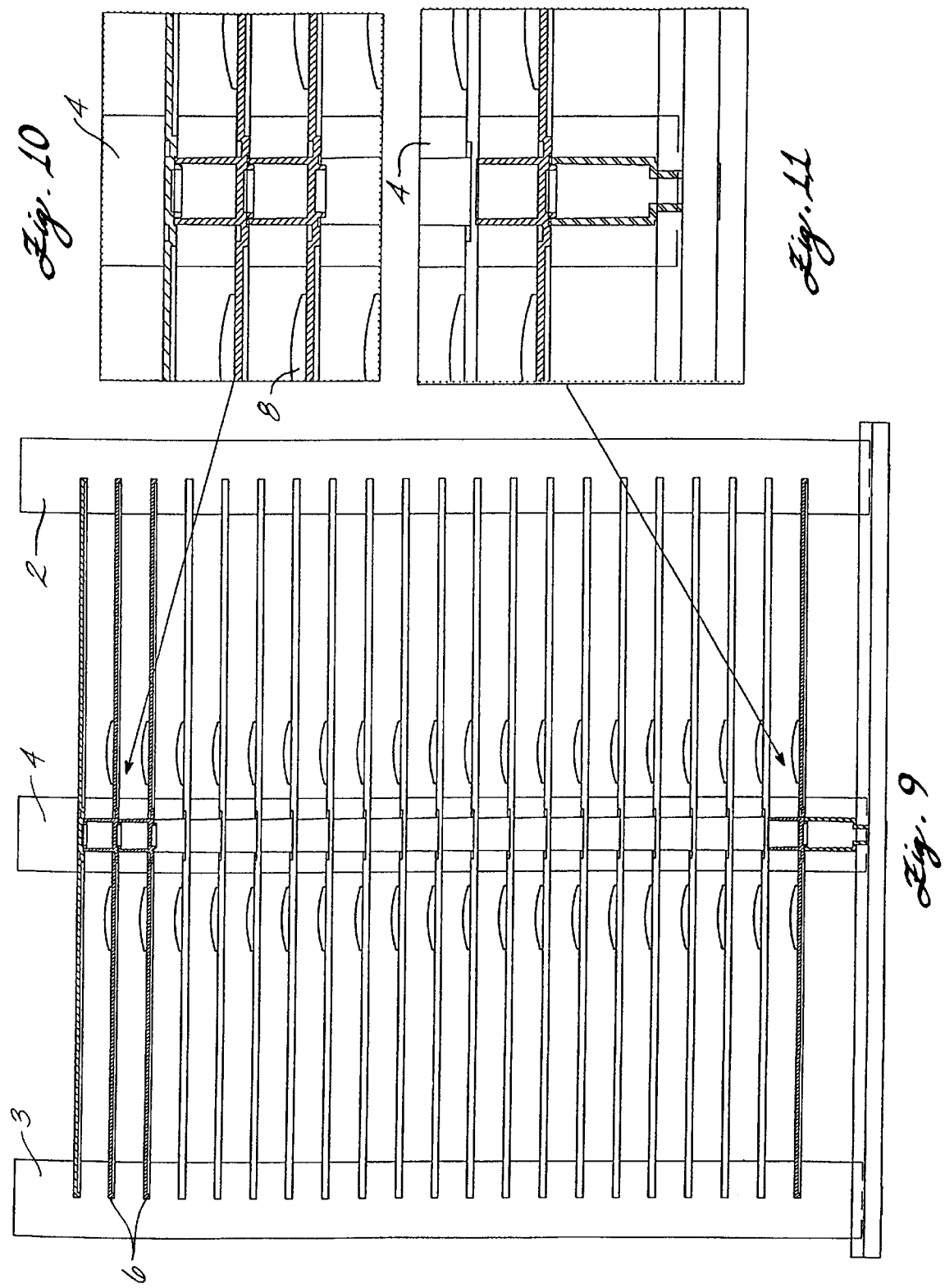

ASSEMBLABLE STORAGE AND DISPLAY UNIT

The present invention relates to an assemblable storage and display unit for storage media items (eg, CDs, VCDs (video CD)s), MDs (mini discs), DVDs or any similar media) whether packaged or encased or not. The present invention also relates to related methods of storage and display.

Frequently there is a need both at retail outlets and in the office or home environment to store storage media items in such a way that they are tidily and safely housed yet can, at a glance, each be recognised for what it is so that a particular CD or the like (usually in a case) can be quickly extracted for use.

More specifically the present invention is directed to an assemblable form of such a storage and display device which allows individual components of a pack to be quickly assembled for such use.

Whilst forms of assemblable storage display units have hitherto been available in some countries very seldom, if at all, has there been provision for a side by side presentation of multiple storage media items on each shelf level.

It is therefore an object of the present invention to provide an assemblable storage and display unit for storage media items where it is possible, without stacking of such items directly on to one another, to display at each shelving level a multiple of such items.

In a first aspect the present invention relates to an assemblable storage and display unit for CDs, VCDs (Video CDs), MDs (Minidisk), DVDs or any similar media (packaged, encased or not) (hereinafter "storage media item or items") comprising a first column member, a second column member, a third column member, and a plurality of shelve members, (preferably) characterised in that, in an assembled condition, each of said shelve members are associated with said first, second and third column members and in at least such an assembled condition said first, second and third column members, when considered in plan, are in a stable spaced condition at the apices of a notional triangle;

and (preferably) further characterised in that each shelf member (other than the topmost) can receive onto its surface from a direction columns a plurality of said storage media items each spaced from the or each adjacent item by (i) an upward projection of the shelf member, (ii) a downward projection of the proximate shelf member above (if any), or (iii) both (i) and (ii).

As used herein "column" includes any pillar or like upstanding member whether of constant cross-section or not and whether hollow or not.

Preferably each shelf sufficiently engages each column to derive at least one of vertical and lateral support therefrom.

Preferably the spacing of the storage media, at least for some of those shelf members below the top most shelf members, is by a bearing inter-engagement between proximate shelf members involving (i), (ii) or (iii).

Preferably the spacing of the storage media, at least for some of those shelf members below the top most shelf member is by an indexing inter-engagement between proximate shelf members involving (i), (ii) or (iii).

Preferably each shelf member is adapted to store and display two storage media items only on each shelf member.

Alternatively, preferably each shelf member is adapted to store and display three storage media items on each shelf member.

Preferably each shelf member is a moulded member incorporating said projection(s) member.

Preferably each shelf member has both an upward and downward projection which in the assembled unit provides a vertical axis on which most of said projection(s) index, butt or bear.

Preferably each shelf member has, for each item it is to display to the direction from which it is to be loaded, a scalloped periphery when viewed in plan.

Preferably at least two of said columns, for each shelf level, each has an opening into which a shelf member is to enter to thereby depend on the respective column for at least some measure of vertical support.

Preferably said columns are tubular and said openings are horizontally extending slots.

Preferably said shelf members also each include at least one additional projection for each storage media item to be received onto a surface thereof to assist item location.

Preferably column supporting means is provided that positions or has positioned said columns in said stable spaced condition prior to association of any shelf members therewith Preferably said column supporting means is a base for the unit from which the columns upstand although it could instead or in addition have a top.

Preferably plurality of said storage media items can be positioned on a shelf between the same two columns.

In a further aspect the invention is an assemblable storage and display unit for storage media items comprising a first column member, a second column member, a third column member, and a plurality of shelve members, (preferably) characterised in that, in an assembled condition, each of said shelve members are associated with said first, second and third column members by having been nosed into receiving openings in the columns and in at least such an assembled condition said first, second and third column members, when considered in plan, are in a stable spaced condition at the apices of a notational triangle;

and (preferably) further characterised in that each shelf member can receive (without stacking of such items one upon another) onto its surface from a direction between columns (whether between the same two columns or not) a plurality of said storage media items each spaced from the or each adjacent item, such spacing being ensured or encouraged by the upper surface relief characteristics of each shelf member.

Preferably each item projects or is to project outwardly beyond a periphery of its shelf member when properly positioned.

In still a further aspect the present invention consists in a storage and display unit of any of the previously described types having stored and displayed therein a plurality of storage media items, there being at least a couple spaced side by side on at least one shelf level.

In still a further aspect the present invention consists in a method of storing or a method of displaying storage media Items which involves the operative use of a unit in accordance with the present invention.

In still a further aspect the present invention consists in, as a kit, an assemblable storage and display unit of any of the previously defined kinds.

In yet a further aspect the present invention consists in, in combination, shelf members of a kind for incorporation into an assemblable storage and display unit of any of the kinds previously set forth.

In yet a further aspect the present invention consists in an assemblable structure which provides the three columns of an assemblable storage and display unit of any of the kinds previously set forth.

Preferred forms of the present invention will now be described with reference to the accompanying drawings in which:

FIG. 1 is a perspective frontal view of one preferred form of the present invention adapted to receive CDs or other storage media items (i.e., the disks (of whatever format) (if disks at all) within their case) there being the prospect of inserting two such items at each shelf level by insertion between the same two columns notwithstanding the fact that there is preferably an alignment of projections and possibly other projections between the individual items, items being shown in the lowermost shelving levels only for ease of view;

FIG. 2 shows an alternative arrangement to that of FIG. 1 where a similar arrangement exists but here the shelf members are such as to have allowed or encouraged the insertion, at each shelf level, of a pair storage media items a different pairing of two out of the three columns, there preferably still however being some measure of projection provided separation between proximate shelves as in FIG. 1 (but not necessarily so);

Figure 1:
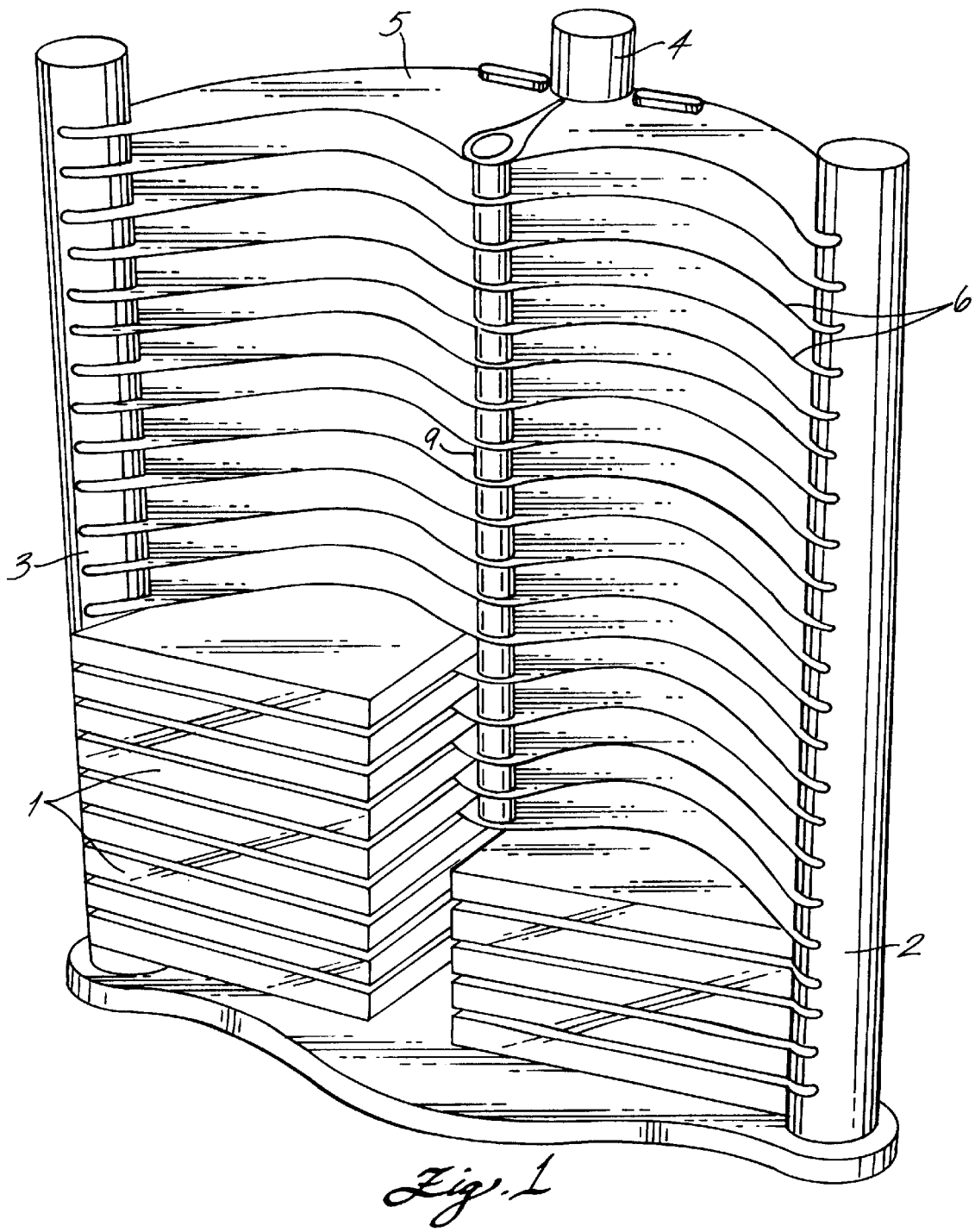
Figure 3:
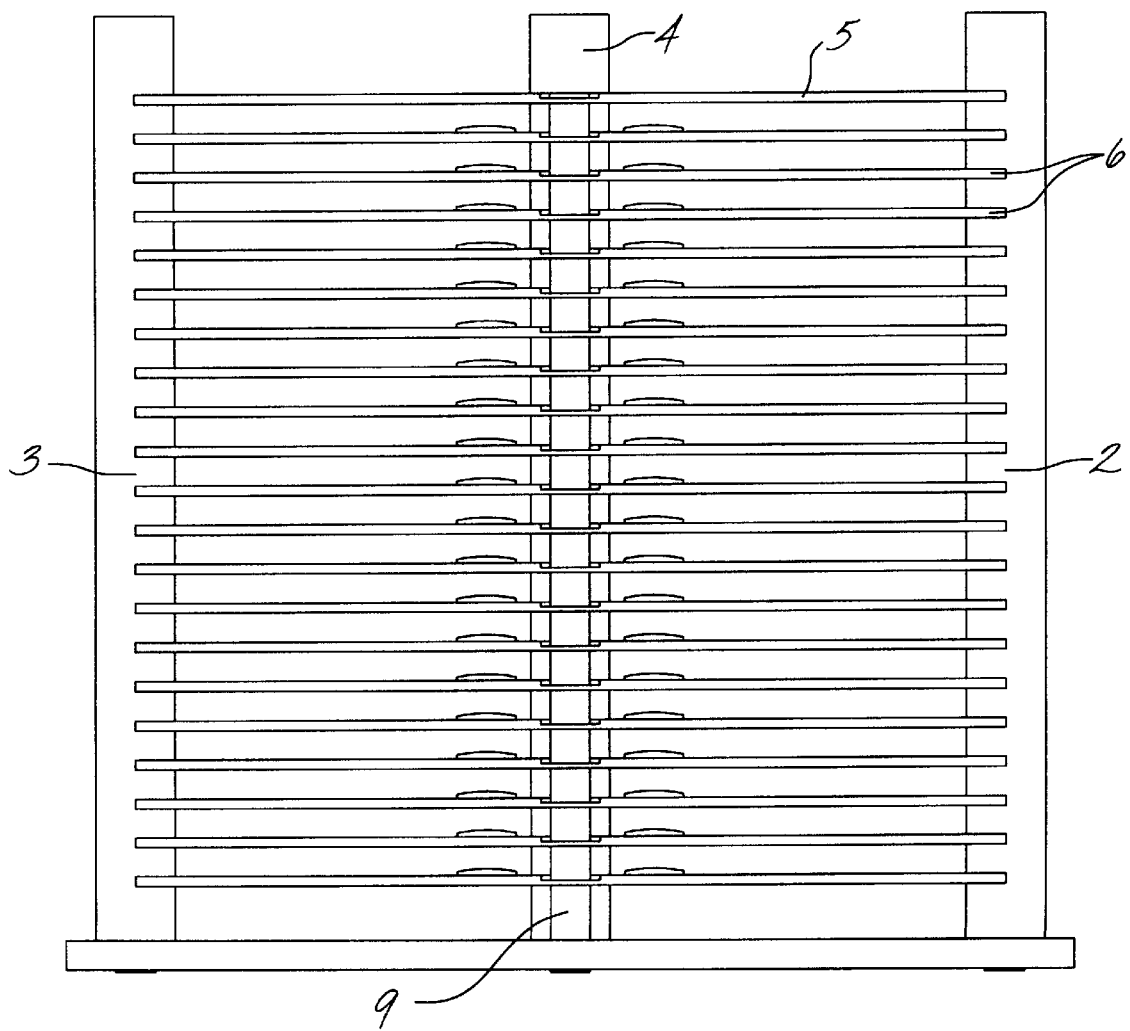
FIG. 3 is a frontal view of the arrangement shown in FIG. 1.
Figure 12:
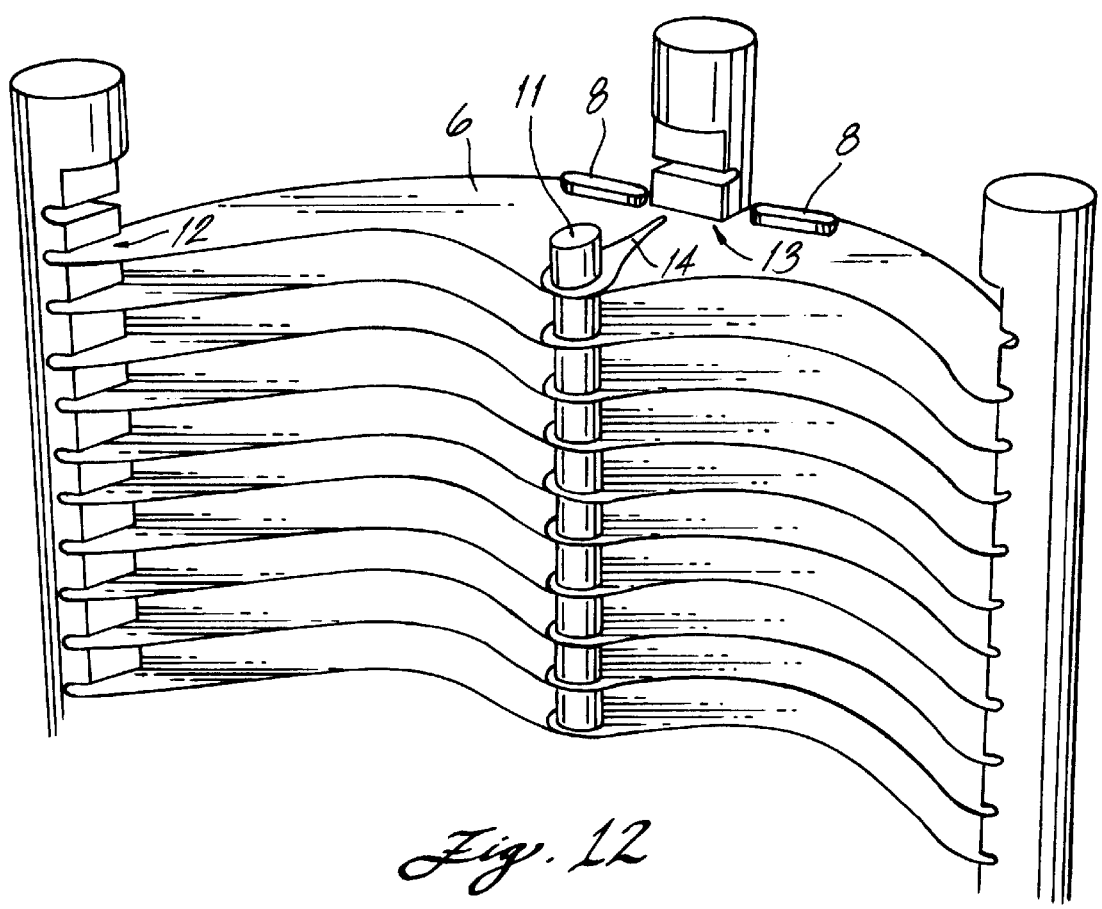
Figure 13:
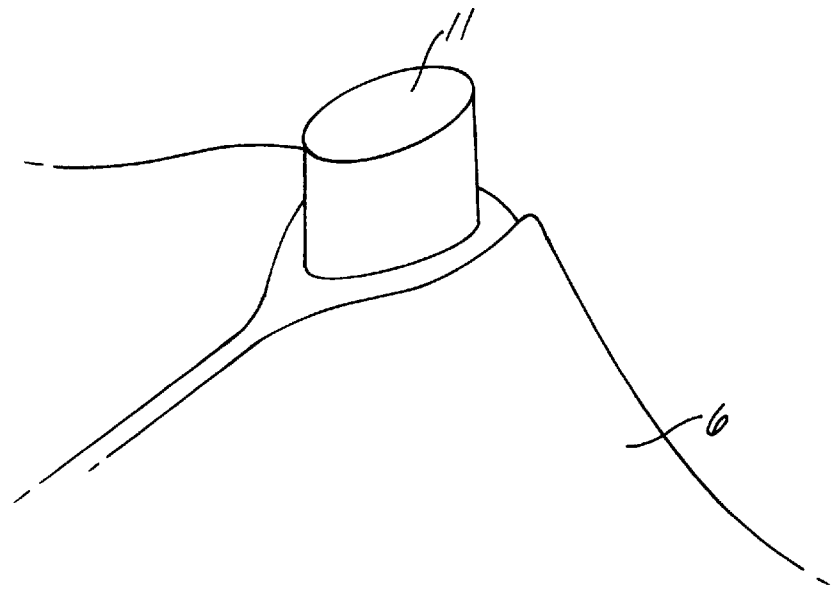
Figure 14:
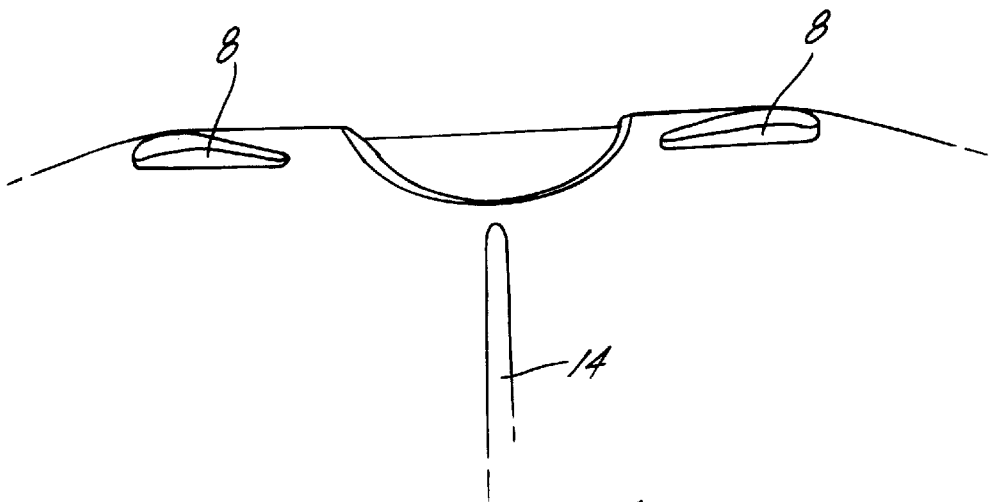
Figure 15:
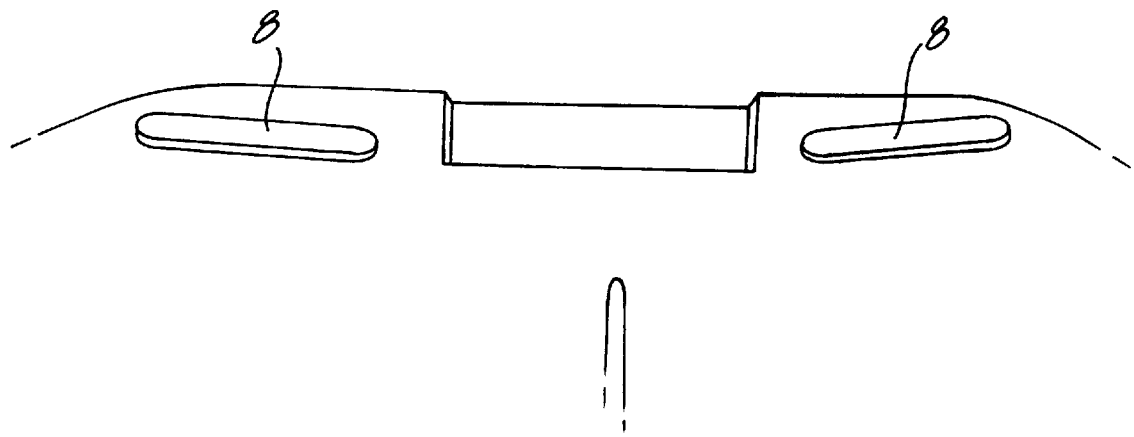
Figure 16:
Figure 17:
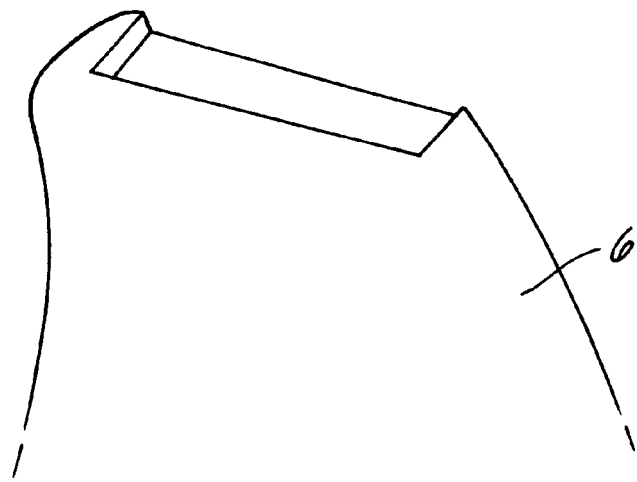
Figure 18:
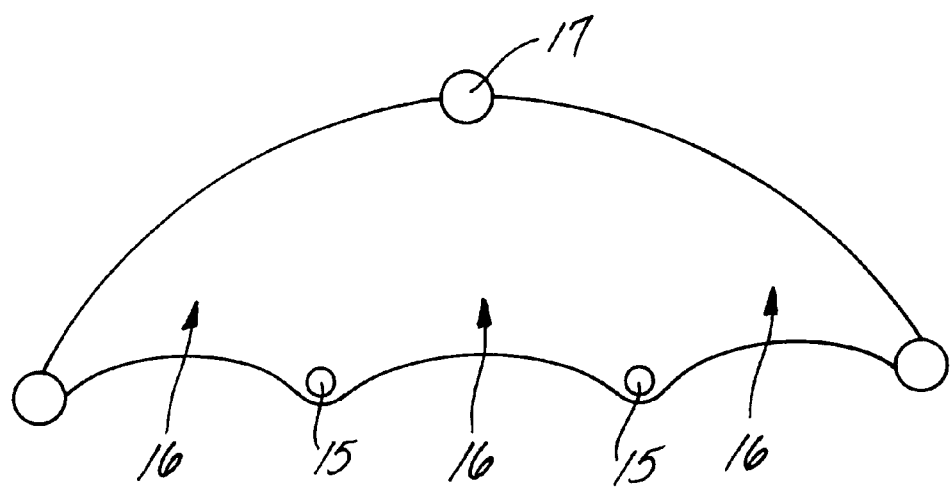

FIG. 9 is a similar view to that of FIG. 3 but showing, in section, the upper shelves and preferably a top member and the lower shelf and an underlying support member from the base, such section being taken through the preferred aligned projections between shelf members which in the case of the embodiment of FIG. 1 preferably provides at least part of the relief or other separation to encourage side by side placement of two items on a same shelf in a spaced relationship;

FIG. 10 is a close up of the indexing/bearing/butting inter-engagement (preferably female onto male) referred to for the upper shelf region of the devices shown in FIG. 9;

FIG. 11 is a similar view to that of FIG. 10 but his time in respect of the lower shelf;

FIG. 12 shows a perspective view from the front of an assembly as shown in FIG. 1 showing the top removed and showing an upward projection and additional projections to assist in the location of two spaced apart media storage items;

FIG. 13 is an enlarged view of the upward projection shown in FIG. 12 from the other side;

FIG. 14 is a detail of the back region of the top of a structure as depicted in FIG. 1 showing the relieved thickness of that part which is preferably to nose into a slot of the central rearward column and showing, flanking the same, the additional projections for accurate item placement;

FIG. 15 is an alternative to the arrangement shown in FIG. 14 such as might be used for a lower shelf member in an assembly;

FIG. 16 is a typical end of each shelf member showing a preferred relief of the thickness of a region thereof adapted to nose into a receiving slot of a preferred column in accordance with the present invention, such an arrangement ensuring both vertical support and a measure of horizontal location;

FIG. 17 is an alternative to the arrangement shown in FIG. 17 which could be used for lower shelving members in the structure; and FIG. 18 is a simplified plan view of an alternative form of structure shown from above which, whilst depicting a still preferably triangular array of columns supporting a shelf, has means to provide the placement side by side of three media storage units.

In the preferred form of the present invention the product would be supplied as a packed kit or would be preassembled depending on the particular.

In the preferred form of the present invention preferably the shelf members are formed from a suitable plastics material capable of being moulded by, for example, an injection moulding process. Suitable materials include any appropriate thermoplastic or thermosetting material including, for example, PVC (polyvinyl chloride), ABS (Acrylonitrile-Butadiene-Styrene) polycarbonate, etc. A most preferred material is GPPS (General Purpose Polystyrene), or PC (Poly-Carbonate).

Whilst the columns and indeed also the base might likewise be formed from such materials they can, if desired, instead be formed from, in the case of the columns, an appropriate metal, such as aluminium, and, in respect of the base, from an appropriate metal (eg, aluminium) or indeed wood or a plastics material.

Figure 2:
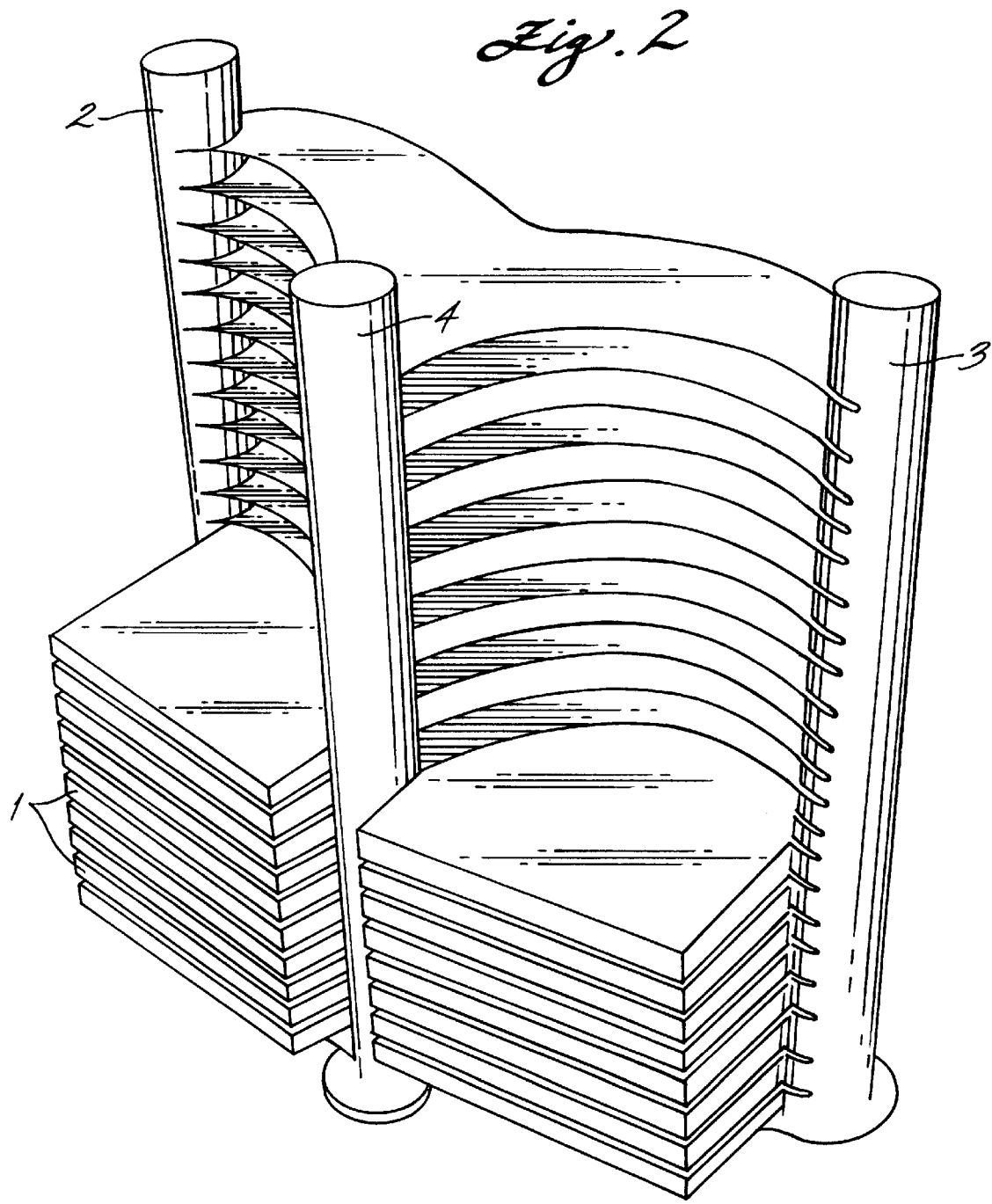

Several embodiments of the invention are envisaged quite apart from those depicted by reference to FIGS. 1 and 2.

In the preferred form of the present invention as shown in FIG. 1 storage media items 1 are stacked side by side on unitary (or less preferably fabricated) shelves in a spaced side by side arrangement where there is an enforced or encouraged separation of the items of each shelf level but still between the front columns 2 and 3 by the provision of an aligned composite column or pillar 9 arising from the complement of the projections (preferably integrally formed in each shelf) which ideally butt, index or bear (but not necessarily so) on each proximate shelf member.

Also shown in FIG. 1 is a rear column or pillar 4 and a top shelf 5 which, in the preferred form of the present invention, is of a different appearance to preferably the remainder of the shelf members 6 within the multi-level unit.

FIG. 2 shows an alternative arrangement to that of FIG. 1 where pillar 4 which previously was rearmost might be the front pillar or column 4 whilst the position of the pillars or columns 2 and 3 are reversed. In such an arrangement preferably the relief profiling of each shelf differs so as to encourage placement of item on either side of the front column or pillar back into the shelf (preferably against other relief features which will enhance location for alignment of the multiple storage media items 1 as shown). In such a form preferably there is also a projection alignment as shown in FIG. 1 but not necessarily so.

FIG. 3 shows in elevation the detail of the unit as shown in FIG. 1. Each shelf member 6 in this form preferably receives from above a leg preferably integrally formed in the shelf member 6 proximate thereto (preferably in a female down onto a male arrangement, i.e. the downward projection preferably being a socket into which a male up stands of the underlying shelf fits for indexing purposes). However the reverse or other arrangements can be employed.

A person skilled in the art will appreciate how there could be both an upper and lower projection which butts midway between the shelves or comes into some close proximity or overlap arrangement. Alternatively there can be a recess in one into which the other protrudes, etc., still thereby ensuring some degree of alignment between the shelves to provide for the aesthetics which will carry through, because of the relief characteristics on each shelf member for item placement, the prospect of aligned presentation of outwardly extending items 1 as shown in FIG. 1 or indeed as shown in FIG. 2.

Figure 4:
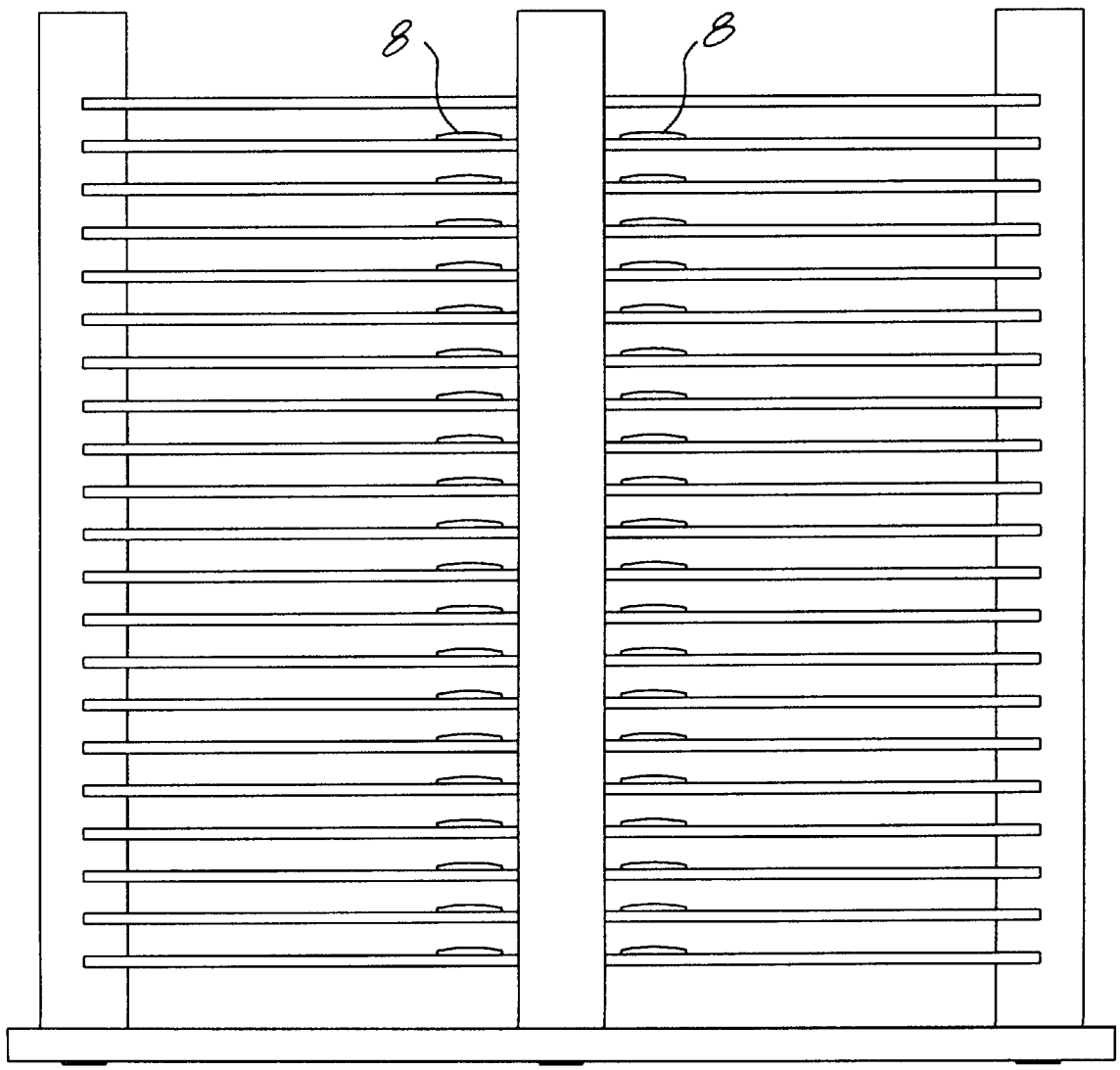
FIG. 4 is a rear view of the arrangement shown in FIG. 1.
Figure 5:
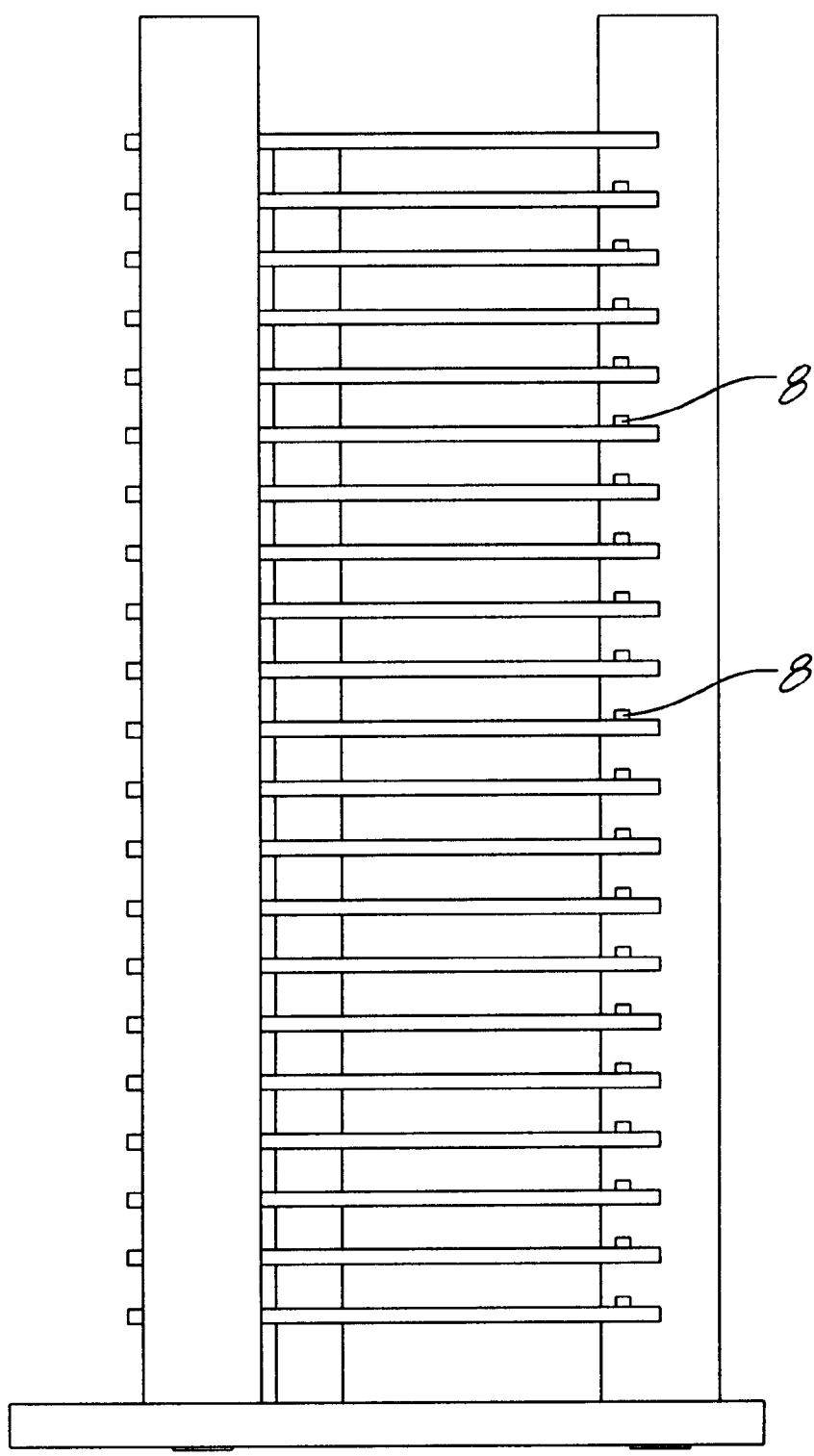
FIG. 5 is a right side view of the arrangement shown in FIG. 1.
Figure 6:
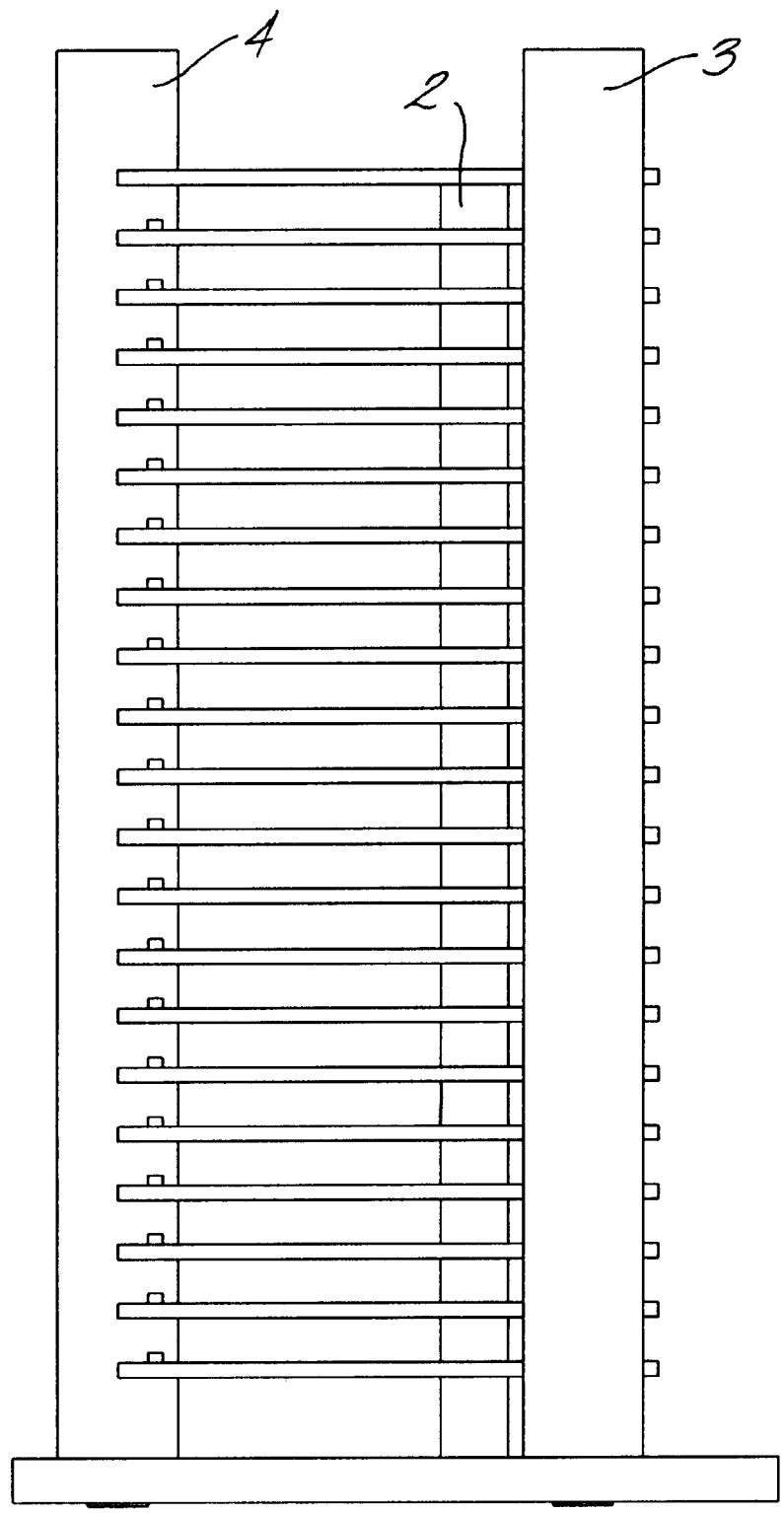
FIG. 6 is a left side view of the arrangement shown in FIG. 1.

Shown in FIGS. 4 and 5 are relief features 8 adapted to assist in item location on each shelf member.

Shown in FIG. 12 is an upstand male member 11 adapted to be received within a downward leg projection which is female in character.

Also shown on a shelf 6 in FIG. 12 are regions 12 (one preferably being the mirror image of the other) and 13 for nosing into complementary slots (see FIG. 12) of each pillar or column, i.e., regions 12 nose into slots in pillars 2 and 3 and in the embodiment of FIG. 1 region 13 noses into slots of the column or pillar 4 shown in FIG. 1.

Also shown in FIGS. 12 and 14 are upstand type projections 14 which additionally assist in item location. Preferably where an item is being inserted there is bearing substantially against a region 9 and a pillar or column 2 or 3 as well as the back stop member 8. The upstand region 14 preferably is provided to minimise skewing during insertion and to ensure a better prospect of appropriate alignment once pressed home against the back stop member 8.

FIG. 18 shows still a further geometry that can be used viced with the three pillars or columns still being shown but having two aligned regions 15 each similar in character to 9. These will have the effect of allowing, on a particular shelf, three storage media items to be located in a spaced relationship still embodying the loading characteristics shown in FIG. 1. The same, of course, would be true in relation to the reverse type loading scenario (as in FIG. 2) for even numbered multiples to be stored on each level but, of course, rear loading of a configuration is shown in FIG. 18 would have a difficulty for a central item owing to the positioning centrally of the third column or pillar 17.

Figure 7:
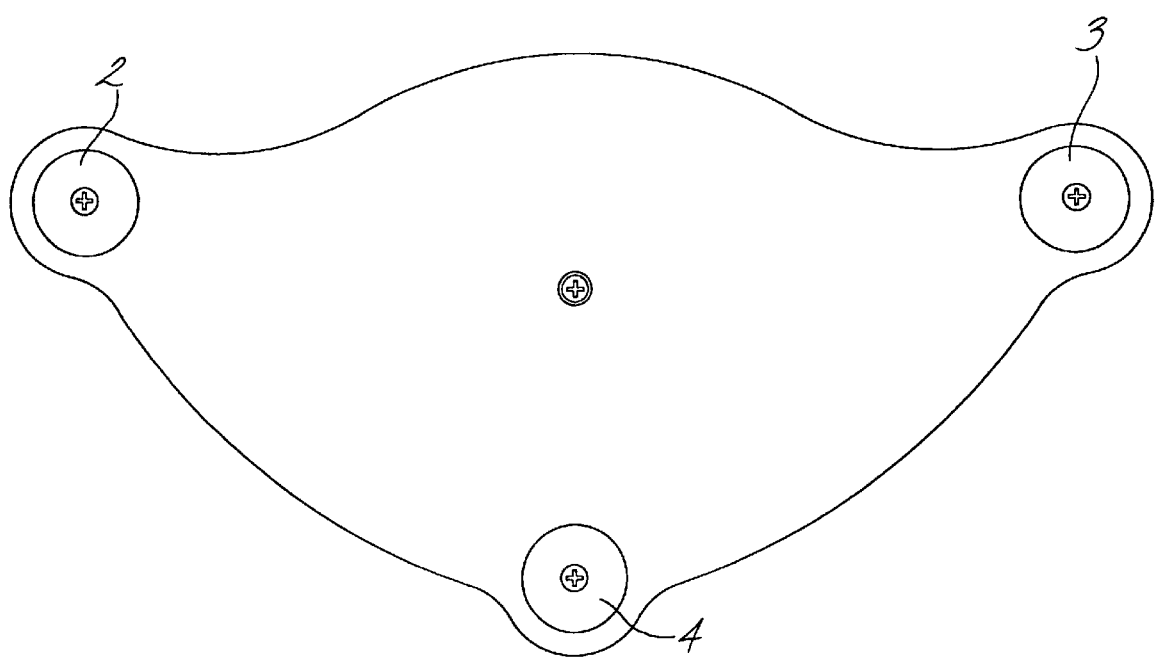
FIG. 7 is a view from below of the arrangement shown in FIG. 1, i.e., a base to which the columns are affixed (eg, by screwing)
Figure 8:
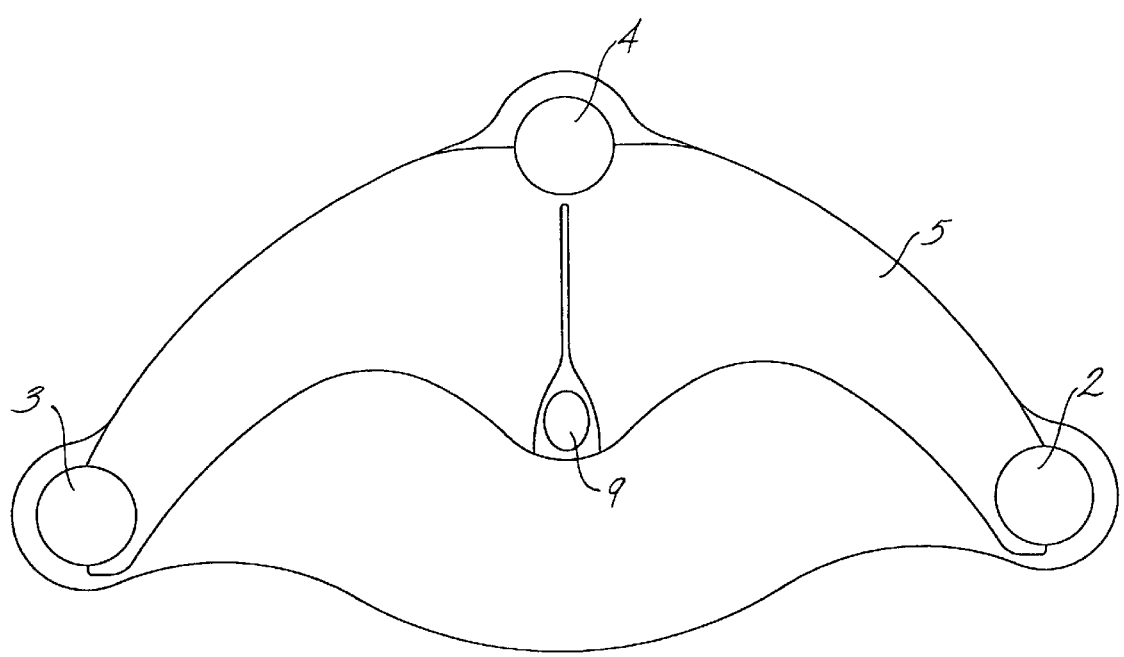
FIG. 8 is a plan view of the arrangement shown in FIG. 1, (each of FIGS. 3 through 8 not showing any of the storage media items for clarity)

From the foregoing it can be seen that the present invention provides a unit capable of being marketed in an unassembled form and which upon unpacking can readily be assembled such that screws etc. (as shown in the base view of FIG. 7) can connect the base to the appropriate pillars and thereafter the shelves can thereafter be nosed into the appropriate apartment. Preferably the arrangement is such that the length of the slot and the freedom of movement of each region of a shelf which is to nose into a slot is such that there can be vertical support for each shelf member from each of the three columns or pillars and there is no need to prelocate shelves prior to any (optional) fixing to a base of the columns. Where there is no such base preferably the lateral retention by each column of a shelf member is more positive.

Preferably in addition by indexing between shelves and preferably also supporting the lowermost shelf with a underlying packing member from the base an alignment of indexed bearing abutments results in an integral relationship of the shelves together to ensure accurate alignment of any items to be packed into the assembled unit and at the same time to minimise any tendency for movement of any of the shelves relative to their supporting column or pillar. An arrangement of the present invention lends itself for expansion into other configurations.

What is claimed is:

1. An assemblable storage and display unit for CDs, VCDs (Video CDs), MDs (Minidisk), DVDs or any similar media (packaged or not) storage media items, comprising:

a first column member;

a second column member;

a third column member;

wherein each of the first, second and third column members include a plurality of slots therein, and in an assembled condition said first, second and third column members are in a spaced apart relationship at apices of a notional triangle;

a plurality of shelf members, each shelf having an upwardly facing surface for supporting at least two storage media items in a side by side relationship, and a downwardly facing surface, wherein, in the assembled condition, each of said plurality of shelf members is engaged with a respective slot of said plurality of slots of each of said first, second, and third column members and each of said plurality of shelf members provide at least one relief extending from at least one of the upwardly or downwardly facing surfaces to locate against a portion of an immediately proximate shelf where such portion is:

a) the other of the upwardly or downwardly facing surface of the proximate shelf or, b) a relief therefrom, wherein each shelf member can receive onto its upwardly facing surface from a direction between said columns at least two storage media items, each storage media item spaced from the adjacent storage media item at least in part by said relief.

2. A unit as claimed in claim 1 wherein each shelf member is engaged into the slots of the column members in a manner to be supported therefrom in a substantially horizontal condition.

3. A unit as claimed in claim 1 wherein the interface between said at least one relief and said portion is of a plug to socket type arrangement.

4. A unit of claim 1 adapted to store and display two storage media items only on each shelf member.

5. A unit of claim 1 adapted to store and display three storage media items on each shelf member.

6. A unit of claim 1 wherein each shelf member comprises a molded material.

7. A unit of claim 6 wherein each shelf member comprises an upwardly extending relief and a downwardly extending relief which, in the assembled condition, are on a notional axis substantially parallel to the general elongate direction of each column member.

8. A unit of claim 1 wherein said column members are tubular and said slots are horizontally extending.

9. A unit of claim 1 wherein said column members are each located on a base member to hold said column members in the assembled condition in a stable spaced relationship.

10. A unit as claimed in claim 1 wherein the upwardly facing surface comprises an upstanding region extending between said relief and said third column member.

11. A unit as claimed in claim 1, comprising a back stop member disposed on said upwardly facing surface.

12. A unit as claimed in claim 1, wherein the at least one relief is spaced apart from said first, second and third column members such that a first tray for holding storage media items is formed between said first column member and said at least one relief and a second tray for holding storage media items is formed between said second column member and said at least one relief.

13. A storage and display unit, comprising:

at least three column members, each of said column members having a plurality of notches in a side wall thereof;

a plurality of shelf members, each of said shelf members having an upper surface, a lower surface and three notch engagable edge regions;

wherein each of said column members are arranged such that the notches of the column members cooperate to allow each of said notch engagable edge regions of said shelf members to slidably engage with one of the notches of each of the column members;

at least one upward relief spaced apart from said first, second and third column members such that a first tray is formed between said first column member and said relief and a second tray portion is formed between said second column member and said relief, said upward relief extending from the upper surface of at least one of the shelf members and contacting the lower surface of another shelf member.

14. A storage and display unit, comprising:

at least three column members, each of said column members having a plurality of notches in a side wall thereof;

a plurality of shelf members, each of said shelf members having an upper surface, a lower surface and three notch engagable edge regions;

wherein each of said column members are arranged such that the notches of the column members cooperate to allow each of said notch engagable edge regions of said shelf members to slidably engage with one of the notches of each of the column members;

at least one downward relief spaced apart from said first, second and third column members such that a first tray is formed between said first column member and said relief and a second tray portion is formed between said second column member and said relief, said downward relief extending from the lower surface of at least one of the shelf members and contacting the upper surface of another shelf member.

15. A storage and display unit, comprising:

at least three column members, each of said column members having a plurality of notches in a side wall thereof;

a plurality of shelf members, each of said shelf members having an upper surface, a lower surface and three notch engagable edge regions;

wherein each of said column members are arranged such that the notches of the column members cooperate to allow each of said notch engagable edge regions of said shelf members to slidably engage with one of the notches of each of the column members;

at least one upward relief extending from the upper surface of one of the shelf members;

at least one downward relief extending from the lower surface of another shelf member in a mirrored relationship to said upward relief;

said upward relief and downward relief spaced apart from said first, second and third column members such that a first tray is formed between said first column member and said reliefs and a second tray portion is formed between said second column member and said reliefs, said upward and downward relief contacting each other.

\* \* \* \* \*